US009462534B2

(12) United States Patent
Snapp et al.

(10) Patent No.: US 9,462,534 B2
(45) Date of Patent: Oct. 4, 2016

(54) SYSTEM AND METHOD FOR ROUTING A SPECIAL NUMBER CALL FROM A CALLING UNIT TO AN ANSWERING POINT

(71) Applicant: West Corporation, Omaha, NE (US)

(72) Inventors: John Lawrence Snapp, Westminster, CO (US); Daniel Zacek, Boulder, CO (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 13/753,600

(22) Filed: Jan. 30, 2013

(65) Prior Publication Data

US 2013/0203375 A1 Aug. 8, 2013

Related U.S. Application Data

(60) Provisional application No. 61/594,565, filed on Feb. 3, 2012.

(51) Int. Cl.
*H04W 40/20* (2009.01)
*H04M 3/51* (2006.01)

(52) U.S. Cl.
CPC ........... *H04W 40/20* (2013.01); *H04M 3/5116* (2013.01); *H04M 2242/04* (2013.01); *H04M 2242/30* (2013.01)

(58) Field of Classification Search
CPC .................. H04M 2242/22; H04M 2242/04; H04M 7/0075; H04M 2242/30; H04M 3/42042; H04M 3/5116; H04M 3/42153; H04M 3/42161; H04M 7/0009; H04M 3/42229; H04M 7/12; H04L 65/1073; H04L 12/6418; H04L 65/1046; H04W 40/20; H04Q 2213/13109; H04Q 2213/13389; H04Q 2213/13332; H04Q 2213/13097; H04Q 3/0025; H04Q 3/005; H04Q 2213/13103; H04Q 2213/13091
USPC ....................................... 455/404.2
See application file for complete search history.

(56) References Cited

U.S. PATENT DOCUMENTS

| 5,983,097 | A * | 11/1999 | Kakinuma et al. ........ 455/422.1 |
| 6,963,557 | B2 * | 11/2005 | Knox ........................... 370/352 |
| 7,245,900 | B1 * | 7/2007 | Lamb .................. H04M 3/5116 379/37 |
| 7,324,635 | B2 * | 1/2008 | Wood ................ H04M 3/42153 379/142.02 |
| 7,848,769 | B2 * | 12/2010 | Fuller et al. .................. 455/521 |
| 8,060,056 | B1 * | 11/2011 | Hines, III .............. H04M 11/04 379/37 |
| 8,180,316 | B2 * | 5/2012 | Hwang ...................... 455/404.1 |
| 8,301,109 | B2 * | 10/2012 | Reich et al. ............... 455/404.1 |
| 8,462,915 | B2 * | 6/2013 | Breen et al. .................... 379/45 |
| 2006/0276168 | A1 * | 12/2006 | Fuller .................... H04M 11/04 455/404.2 |
| 2008/0013523 | A1 * | 1/2008 | Nambakkam ................. 370/352 |

(Continued)

*Primary Examiner* — Nathan Taylor

(57) ABSTRACT

A system for routing a special number call from a calling unit to an answering point based upon location of the calling unit includes: (a) a communication network configured for effecting communicative coupling between the calling unit and one or more receiving answering point; each receiving answering point having a respective responsibility area; (b) a mobile positioning center coupled with the communication network; the mobile positioning center determining the location of the calling unit within a first location area; (c) a communication switch coupled with the communication network and coupled with the answering point; and (d) a controller unit coupled with the communication switch for controlling selected operations of the communication switch. The mobile positioning center and the controller unit cooperate to effect routing a call from the calling unit to each respective answering point having a respective responsibility area at least partly common with the first location area.

2 Claims, 3 Drawing Sheets

(56) References Cited

U.S. PATENT DOCUMENTS

| | | | |
|---|---|---|---|
| 2011/0065416 A1* | 3/2011 | Burt | H04L 12/6418 455/404.2 |
| 2011/0222441 A1* | 9/2011 | Zhu | H04L 29/06027 370/259 |
| 2012/0276865 A1* | 11/2012 | Wang | H04M 3/5116 455/404.2 |
| 2015/0085997 A1* | 3/2015 | Biage | H04M 3/00 379/45 |
| 2015/0229766 A1* | 8/2015 | Herron, Jr. | H04M 7/006 379/45 |

* cited by examiner

SYSTEM AND METHOD FOR ROUTING A SPECIAL NUMBER CALL FROM A CALLING UNIT TO AN ANSWERING POINT

CROSS-REFERENCE TO RELATED APPLICATIONS

The present patent application is a continuation of and claims priority from patent application Ser. No. 61/594,565, titled SYSTEM AND METHOD FOR ROUTING A SPECIAL NUMBER CALL FROM A CALLING UNIT TO AN ANSWERING POINT, filed Feb. 3, 2012, the entire contents of which are enclosed by reference herein.

FIELD OF THE INVENTION

The present invention is directed to telecommunication systems, and especially to routing special number calls from a calling unit to at least one answering point based upon geographic location of the calling unit.

BACKGROUND OF THE INVENTION

It is established that special number calls, such as by way of example and not by way of limitation emergency service calls, may best be serviced by routing such calls to an answering point assigned to handle situations involving such calls within a geographic responsibility area that includes the geographic location area of the calling unit placing the call. Geographic location area of a calling unit may be ascertained on more than one occasion using different technologies or under different conditions so that later-determined locations may be more accurate than earlier-determined locations.

It is also established that special number calls should be routed to an answering point as soon as possible so that desired service or other response may be carried out as soon as possible. This speed of response is especially important in connection with emergency service calls. Some calls such as emergency service calls may be best taken or received as soon as possible by an answering point that may be close to the calling unit, though not necessarily assigned to render aid to the geographic area in which the calling unit is operating. This may be so for example, to assure that at least some notification of the reported emergency may be received somewhere in the emergency communication system as early as possible in case the emergency service call may be interrupted.

By way of example and not by way of limitation, if a first determination of location of a calling unit is determined only to an accuracy that the ascertained geographic location area for the calling unit is covered by geographic responsibility areas of more than one Public Safety Answering Point (PSAP; sometimes referred to as a Public Safety Answering Position) it may be advantageous to concurrently route the call to more than one PSAP so as to ensure that at least one answering point in the emergency service system receives information in connection with the call before the call may be disconnected or otherwise lost. If a later determination of geographic location of a calling unit is more accurate than an earlier-determined position, the number of receiving answering points may be reduced. If a later determination of geographic location of a calling unit is sufficiently accurate, the number of receiving answering points may be changed to assure that only the one answering point having a geographic responsibility area including the geographical location area of the calling unit may be communicatively coupled with the calling unit.

Examples of special number calls include 9-1-1 calls for seeking emergency services and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

For purposes of illustration, by way of example and not by way of limitation, the present invention will be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

There is a need for a system and method for concurrently routing special number calls from a calling unit to at least two answering points having geographic responsibility area at least partly in common with geographic location area of the calling unit.

SUMMARY OF THE INVENTION

In accordance with one aspect of this invention, disclosed is a system for concurrently routing a special number call from a calling unit to at least two receiving answering points having geographic responsibility area at least partly in common with geographic location area of the calling unit. The system includes: (a) at least one communication network; each respective communication network of the at least one communication network being configured for effecting communicative coupling between the calling unit and the receiving answering points; each of the receiving answering points having a respective geographic responsibility area; (b) at least one mobile positioning center coupled with the at least one communication network; the at least one mobile positioning center determining the geographic location of the calling unit within a first geographic location area; (c) at least one communication switch coupled with the at least one communication network and coupled with the receiving answering points; and (d) at least one controller unit coupled with the at least one communication switch for controlling selected operations of the at least one communication switch. The at least one mobile positioning center and the at least one controller unit cooperate to effect concurrently routing a call from the calling unit to each receiving answering point having a respective geographic responsibility area at least partly common with the first geographic location area.

In accordance with another aspect of this invention, disclosed is a method for concurrently routing a special number call from a calling unit to at least two receiving answering points having geographic responsibility area at least partly in common with geographic location area of the calling unit. The method includes: (a) in no particular order: (1) providing at least one communication network; each respective communication network of the at least one communication network being configured for effecting communicative coupling between the calling unit and the receiving answering points; each of the receiving answering points having a respective geographic responsibility area; (2) providing at least one mobile positioning center coupled with the at least one communication network; the at least one mobile positioning center determining the geographic location of the calling unit within a first geographic location area; (3) providing at least one communication switch coupled with the at least one communication network and coupled with the at least two receiving answering points; and (4) providing at least one controller unit coupled with the at least one communication switch for controlling selected operations of the at least one communication switch; and (b) operating the at least one mobile positioning center and the at least one controller unit cooperatively to effect concurrent routing of a call from the calling unit to each receiving answering point having a respective geographic responsibility area at least partly common with the first geographic location area.

It is, therefore, a feature of the present invention to provide a system and method for concurrently routing special number calls from a calling unit from a calling unit to at least two answering points having geographic responsibility area at least partly in common with geographic location area of the calling unit.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as a 9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art of telecommunication system design that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
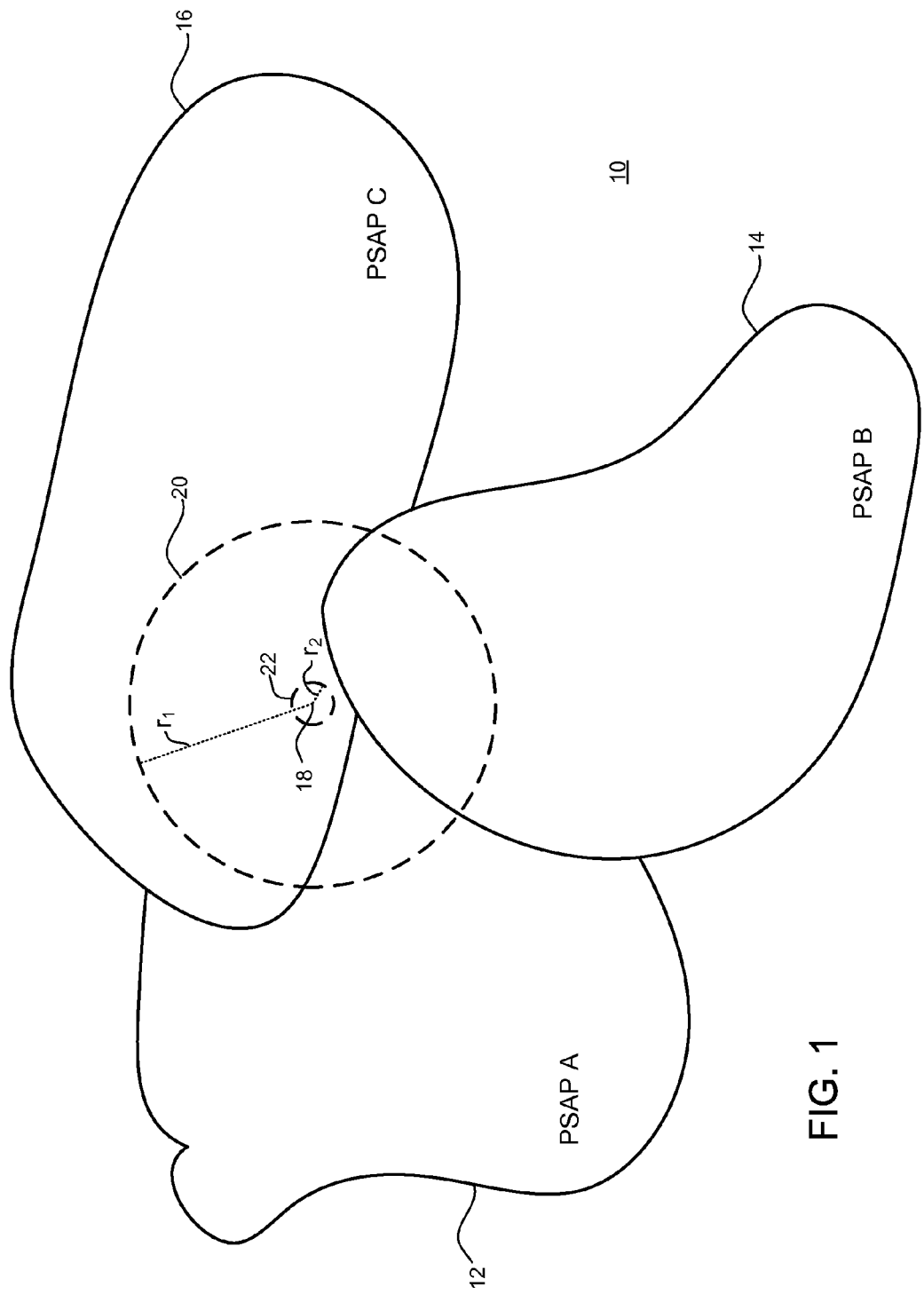
FIG. 1 is a schematic illustration of an environment in which the present invention may be advantageously employed.

FIG. 1 is a schematic illustration of an environment in which the present invention may be advantageously employed. In FIG. 1, a telecommunication environment 10 includes substantially defined geographical responsibility areas associated with respective special number answering points such as, by way of example and not by way of limitation, Public Safety Answering Points (PSAPs; sometimes referred to as a Public Safety Answering Positions). A PSAP A has responsibility for responding to emergencies occurring in a geographic responsibility area 12. A PSAP B has responsibility for responding to emergencies occurring in a geographic responsibility area 14. A PSAP C has responsibility for responding to emergencies occurring in a geographic responsibility area 16.

Locating technology may ascertain location 18 of a calling instrument (not shown in FIG. 1) operating within environment 10 within a certain accuracy or error. A first geographic location area 20 may locate a calling instrument with an accuracy represented by a radius $r_1$ (a larger radius indicating a lesser-accurate determination of location). A second geographic location area 22 may locate a calling instrument with an accuracy represented by a radius $r_2$. Representative radius $r_2$ being less than representative radius $r_1$ indicates that second geographic location area 22 determines location of a found calling unit at location 18 with greater accuracy than is indicated by first geographic location area 20.

First geographic location area 20 indicates that the found calling unit may be at a location 18 situated in any of geographic responsibility areas 12, 14, 16. That is to say, any of PSAP A, PSAP B or PSAP C may be the proper PSAP to handle an emergency call from the found calling unit. Second geographic location area 22 more clearly indicates that the found calling unit is situated within geographic responsibility area 16, and PSAP C is the proper PSAP for handling emergency calls originating from the found calling unit.

In a situation such as the situation illustrated in FIG. 1 where a first determination of location of a calling unit is determined only to an accuracy that the ascertained geographic location area for the calling unit is covered by geographic responsibility areas of more than one PSAP(e.g. geographic location area 20) it may be advantageous to route the call to more than one PSAP so as to ensure that at least one answering point in the emergency service system receives information in connection with the call before the call may be disconnected or otherwise lost. That is, it may be advantageous to route the call to any PSAP having a geographic responsibility area having any common area with geographic location area 20. Applying such an approach to the situation illustrated in FIG. 1, each geographic responsibility area 12, 14, 16 has some common area with first geographic location area 20 so the call from the found calling unit at location 18 may be routed to each of PSAP A, PSAP B and PSAP C.

As also illustrated in FIG. 1, a later determination of geographic location of a calling unit may be more accurate than an earlier-determined position, such as a later-determined location for the found calling unit at location 18 being determined within geographic location area 22. Such a more accurate location determination may permit the number of receiving answering points may be reduced. If a later determination of geographic location of a calling unit is sufficiently accurate, as is the illustrated situation in FIG. 1, the number of receiving answering points may be changed to assure that only the one answering point having a geographic responsibility area including the geographical location area of the calling unit may be communicatively coupled with the calling unit—PSAP C in FIG. 1.

Figure 2:
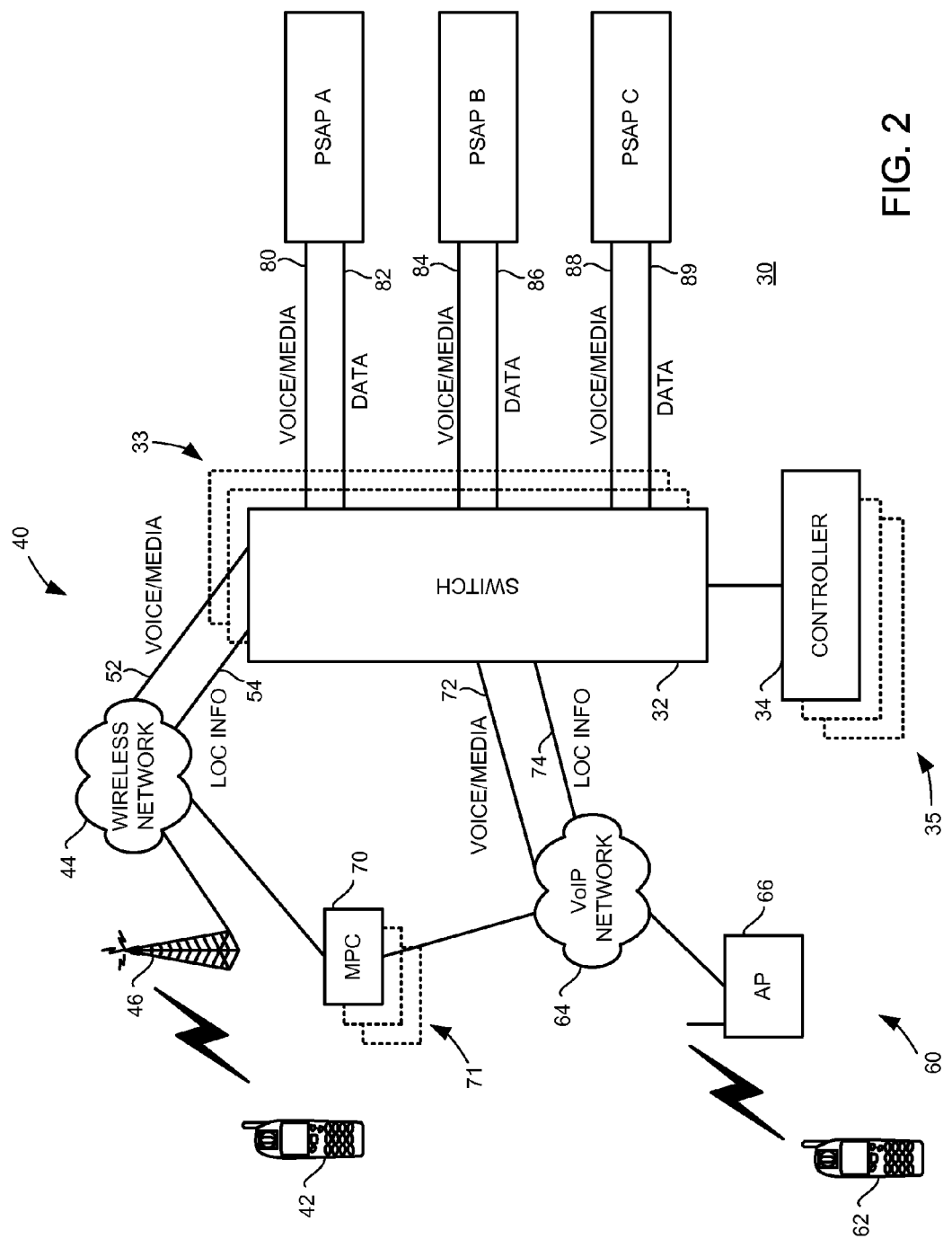
FIG. 2 is a schematic diagram of a system for effecting the present invention.

FIG. 2 is a schematic diagram of a system for effecting the present invention. In FIG. 2, a telecommunication system 30 includes a switch unit 32 coupling telecommunication networks 40, 60 with special number answering points PSAP A, PSAP B, PSAP C. The number of telecommunication networks may be greater or less than two; the number of answering points may be greater or less than three. Switch unit 32 may be embodied in one or more switch units (as indicated at 33), and may include one or more tandem switches in an emergency service network.

Telecommunication network 40 may be a wireless telecommunication network by which a calling unit 42 may wirelessly communicate with a wireless network 44 via a communication tower 46. Telecommunication network 40 is representative of a cellular network and may be recognized by those skilled in the art of telecommunication system design as representing any of several private networks which may be embodied in, by way of example and not by way of limitation, a cellular network or a PCS network employing any of several communication protocols including, by way of further example and not by way of limitation, GSM (Group Speciale Mobile; or Global System for Mobile communications) or another protocol using Time Division Multiple Access (TDMA), Code Division Multiple Access (CDMA) or another coding scheme.

Telecommunication network 60 may be embodied in an Unlicensed Mobile Access (UMA) Network (UMAN) 60 that includes a VoIP (Voice over Internet Protocol) network 64 and an AP (Access Point) 66. UMAN 60 may be configured as, by way of example and not by way of limitation, a Wi-Fi network, a Bluetooth network or another type of UMAN. UMAN 60 permits a calling unit 62 to communicate with a VoIP network 64 via an AP 66.

As is understood by those skilled in the art of telecommunication system design, a Mobile Positioning Center (MPC) 70 may be coupled with wireless network 44 and VoIP network 64 to provide location information to networks 44, 64. There may be more than one MPC 70, as indicated at 71. Each network 44, 64 may have its own discrete MPC, or networks 44, 64 may share MPC 70 as illustrated in FIG. 2.

Location information may be provided by MPC 70 to each of networks 44, 64. Location information may be provided from networks 44, 64 to switch unit 32 in parallel with voice or media information, as indicated by lines 52, 54 and lines 72, 74. Voice or media information may be provided t each PSAP in parallel with data information (which may include location information) as indicated by lines 80, 82, lines 84, 86 and lines 88, 89.

When a call is placed by a calling unit 42, 62 and arrives at switch unit 32, with location information indicating location of the calling instrument 42, 62 at an accuracy illustrated in FIG. 1 by first geographic location area 20, controller 34 may direct switch unit 32 to route the extant call to all PSAPs having geographic responsibility areas with some commonality with geographic location area 20. That is, in the example illustrated in FIG. 1, controller 34 will direct switch unit to route the extant call to PSAP A, PSAP B and PSAP C.

If a later-determined indication of location of calling unit 42, 62 is received that is of greater accuracy and the call has not been answered by any PSAP in the interim period before the first location determination and the second location determination, controller 34 may direct switch unit 32 to tear down routing to PSAPs not having geographic responsibility areas common with the newer geographic location area. Preferably, the second determined location is like second geographic location area 22 (FIG. 1) and indicates only a single responsible PSAP. However, if more than one PSAP is still possibly responsible (i.e., has a geographic responsibility area common with the newly determined geographic location area) then a lesser number of PSAPs may be included in the routing of the extant call. This process may proceed iteratively with subsequent location determinations being considered as they are received (before the call is answered), leading to ever more accurate location determination and reducing the number of recipients for routing until, ideally, a single responsible PSAP is identified for routing.

If a later-determined indication of location of calling unit 42, 62 is received that is of greater accuracy and the call has already been answered by a PSAP in the interim period before the first location determination and the second location determination, controller 34 may direct switch unit 32 differently. If a properly responsible PSAP may be determined from the subsequently received location information, routing to PSAPs not having geographic responsibility areas common with the newer geographic location area may be torn down, as before. However, in this second situation, routing to a non-responsible PSAP that has answered the call (an answering non-responsible PSAP) is not torn down. In this second situation (i.e., the call has been answered in the interim period between location determinations) the answering non-responsible PSAP is preferably notified of the corrected location and the proper responsibility for handling the emergency situation. The answering non-responsible PSAP may also be offered an option whether to transfer the call to the properly responsible PSAP. Such an offering of a choice to a first-answering PSAP whether to transfer the call provides assurance of continuity in handling the call and assurance of a human operator being involved in such a decision. Preferably in this situation as in the already-answered call situation described above, the second determined location is like second geographic location area 22 (FIG. 1) and indicates only a single responsible PSAP. However, if more than one PSAP is still possibly responsible (i.e., has a geographic responsibility area common with the newly determined geographic location area) then a lesser number of PSAPs may be included in the routing of the extant call. This process may proceed iteratively with subsequent location determinations being considered as they are received, leading to ever more accurate location determination and reducing the number of recipients for routing until, ideally, a single responsible PSAP is identified for routing.

Figure 3:
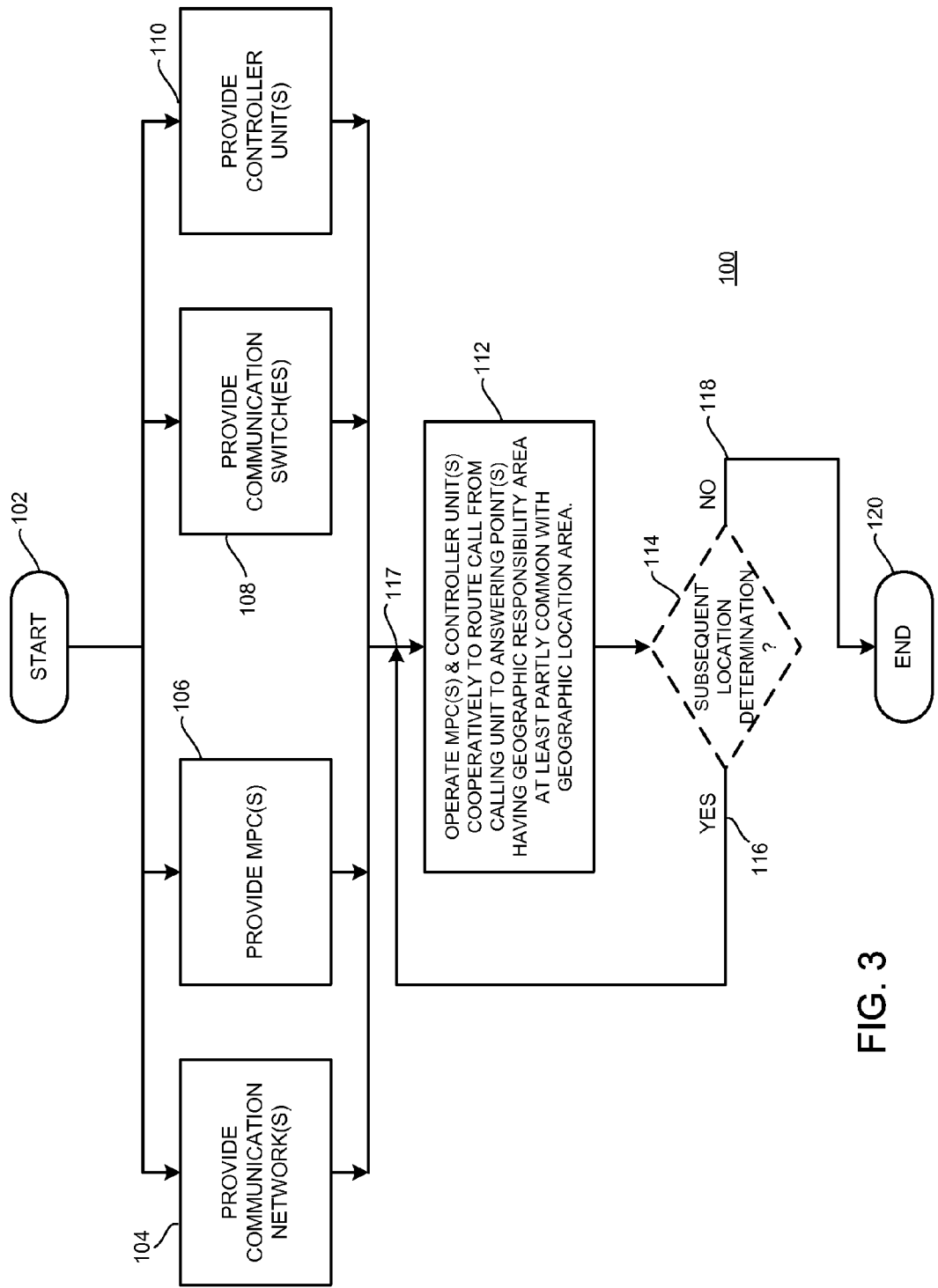
FIG. 3 is a flow diagram illustrating the method of the present invention.

FIG. 3 is a flow diagram illustrating the method of the present invention. In FIG. 3, a method 100 for routing a special number call from a calling unit to at least one answering point based upon geographic location of said calling unit begins at a START locus 102.

Method 100 continues with, in no particular order: (1) providing at least one communication network, as indicated by a block 104; each respective communication network being configured for effecting communicative coupling between the calling instrument and one or more receiving answering point of the at least one answering point; each of the one or more receiving answering point having a respective geographic responsibility area; (2) providing at least one mobile positioning center coupled with the at least one communication network, as indicated by a block 106; the at least one mobile positioning center determining the geographic location of the calling unit within a first geographic location area; (3) providing at least one communication switch coupled with the at least one communication network and coupled with the at least one answering point, as indicated by a block 108; and (4) providing at least one controller unit coupled with the at least one communication switch for controlling selected operations of the at least one communication switch, as indicated by a block 110.

Method 100 continues with operating the at least one mobile positioning center and the at least one controller unit cooperatively to effect routing a call from the calling unit to each the respective answering point having a respective geographic responsibility area at least partly common with the first geographic location area, as indicated by a block 112.

Method 100 may continue with posing a query whether the at least one mobile positioning center has re-determined the geographic location of the calling unit to be within a second geographic location area, as indicated by a query block 114. If the at least one mobile positioning center has re-determined the geographic location of the calling unit to be within a second geographic location area, method 100 proceeds from query block 114 via a YES response line 116 to return to a locus 117 and repeats steps represented by blocks 112, 114 so that the at least one mobile positioning center and the at least one controller unit operate cooperatively to effect routing subsequent calls from the calling unit to each respective answering point having a respective geographic responsibility area at least partly common with the second geographic location area.

If the at least one mobile positioning center has not re-determined the geographic location of the calling unit to be within a second geographic location area, method 100 proceeds from query block 114 via a NO response line 118 to terminate at an END locus 120.

Involvement of query block 114 in method 100 is optional, as is indicated by query block 114 being presented in a broken line format.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for concurrently routing a special number call from a calling unit to at least two receiving answering points having geographic responsibility area at least partly in common with a first geographic location area of said calling unit, without regard to caller ID of said calling unit; the system comprising:
   (a) at least one communication network; each respective communication network of said at least one communication network being configured for effecting communicative coupling between said calling unit and said receiving answering points; each of said receiving answering points having a respective geographic responsibility area;
   (b) at least one mobile positioning center coupled with said at least one communication network; said at least one mobile positioning center determining said geographic location of said calling unit within a first geographic location area;
   (c) at least one communication switch coupled with said at least one communication network and coupled with said receiving answering points; and
   (d) at least one controller unit coupled with said at least one communication switch for controlling selected operations of said at least one communication switch;

wherein said at least one mobile positioning center and said at least one controller unit cooperating to effect concurrently routing a call from said calling unit to each said receiving answering point having a respective geographic responsibility area at least partly common with said first geographic location area; and wherein routing to at least one of said at least two receiving answering points is torn down upon determining with greater accuracy a second geographic location area of said calling unit.

2. A method for concurrently routing a special number call from a calling unit to at least two receiving answering points having geographic responsibility area at least partly in common with a first geographic location area of said calling unit, without regard to caller ID of said calling unit; the method comprising:
   (a) in no particular order:
      (1) providing at least one communication network; each respective communication network of said at least one communication network being configured for effecting communicative coupling between said calling unit and said receiving answering points; each of said receiving answering points having a respective geographic responsibility area;
      (2) providing at least one mobile positioning center coupled with said at least one communication network; said at least one mobile positioning center determining said geographic location of said calling unit within a first geographic location area;
      (3) providing at least one communication switch coupled with said at least one communication network and coupled with said at least two answering points; and
      (4) providing at least one controller unit coupled with said at least one communication switch for controlling selected operations of said at least one communication switch; and
   (b) operating said at least one mobile positioning center and said at least one controller unit cooperatively to effect concurrently routing a call from said calling unit to each said receiving answering point having a respective geographic responsibility area at least partly common with said first geographic location area; and
   (c) operating said at least one mobile positioning center and said at least one controller to effect tearing down routing to at least one of said at least two receiving answering points upon determining with greater accuracy a second geographic location area of said calling unit.

* * * * *